United States Patent Office 3,321,407
Patented May 23, 1967

3,321,407
ETHYLENEDIAMINE-TETRAHYDROFURAN PAINT-STRIPPING COMPOSITIONS
Myer Rosenfeld, Baltimore, Md., assignor to the United States of America as represented by the Secretary of the Army
No Drawing. Filed July 2, 1964, Ser. No. 380,100
6 Claims. (Cl. 252—153)

The invention described herein may be manufactured and used by or for the Government for governmental purposes, without the payment to me of any royalty thereon.

This invention relates to novel compositions of matter useful for stripping or softening paint and processes employing the same. Both the compositions and the processes are particularly concerned with the removal of paint from a nonferrous metal base.

The compositions of the invention are mixtures of ethylenediamine and tetrahydrofuran in which the ethylenediamine:tetrahydrofuran volume ratios vary between 30:70 and 70:30; the preferred ratios of ethylenediamine to tetrahydrofuran are in the range 60:40–50:50, respectively. In one form of the invention, the composition contains additionally water up to 17% by volume of the ethylenediamine present, about 15–17% being preferred. A conventional stabilizer for the tetrahydrofuran may also be added, e.g., 0.1% by weight of hydroquinone calculated on the basis of the weight of tetrahydrofuran.

The mixtures described above are corrosive to magnesium. Corrosive attack on this base is readily avoided by a small but effective amount of colloidal silica. An effective amount of this material is provided by adding to the paint-stripping mixtures 2 to 3% by volume of a 40° Baumé solution of sodium silicate diluted with four parts of water. The order of addition is highly important, since effective inhibition is obtained with one order only. Tetrahydrofuran and the diluted sodium silicate solution are first mixed and the ethylenediamine, alone or mixed with water, is then added. Any additional water is added last. Thorough agitation is employed during or after each of the mixing steps. The explanation of the criticality of the order of addition probably lies in the effect of the dilution on the ultimate particle size of the colloidal silica. When sodium silicate inhibition is employed, the total water added, including that from the sodium silicate solution, should not exceed about 17.5% by volume of the volume of ethylenediamine, or insufficient allowance will have been made for water absorbed from recondensation of ethylenediamine fumes.

The ethylenediamine, tetrahydrofuran and other chemicals used in the invention may be of the usual chemical grade.

In its process aspect, the invention comprises contacting a painted surface with one of the aforesaid compositions for a short and noncritical period of time, usually not more than an hour, at ambient or room temperature. If the paint has not been spontaneously removed during this contact period, it can be scraped off the base as by steel wool. If it is desired to remove the paint solely by spraying with water, a contact time of up to six hours or so may be necessary.

It will be evident from the examples below that the invention is especially useful for the removal of aged, amine-cured, epoxy paints. It is also effective with other paint systems, e.g., semigloss alkyd enamel; alkyd base, rust-inhibiting, iron oxide primer top-coated with lusterless alkyd enamel; nitrocelulose-alkyd lacquers; styrenated alkyd lusterless enamels over a primer of zinc chromate; alkyd phenolic resin dispersions; etc.

The invention is particularly useful with paint on non-ferrous metal bases such as aluminum and magnesium but is equally useful with ferrous metal bases such as steel. It is also effective with workpieces in which magnesium, aluminum and steel are galvanically coupled.

The examples which follow are illustrative of the paint stripping compositions of my invention. In these examples temperatures are ambient and parts or percentages are by volume unless otherwise noted. The ethylenediamine (EDA) used in the runs reported was more than 98% pure, the initial water content probably being below 1%. The tetrahydrofuran (THF) was chemically pure, B.P. 65° C., and contained 0.1% by weight of hydroquinone as a stabilizer. The paint-stripping mixtures employed were mixed as described above and contained an effective amount of colloidal silica as a corrosion inhibitor.

*Examples 1–11*

A series of test runs was conducted in the removal of an amine-cured, baked, epoxy paint system from finished magnesium (Dow 17) panels. Dow 17 finished magnesium is obtained by anodizing magnesium in a bath of ammonium acid fluoride, sodium dichromate and phosphoric acid at 75 to 100 volts from 1 to 30 minutes at 5 to 50 amps. per square foot, the treatment usually being made at 180° to 212° F. Depending upon the particular current density, time of treatment and temperature used, coatings of 0.0002 to 0.001 inch thick are obtained.

An epoxy paint was mixed with ethylenediamine as a curing agent and applied to the anodized magnesium panels. The freshly painted panels were baked at 300° F. for 20 minutes and cooled. Four drops of paint-stripping composition were placed on the coating and allowed to stand for 25 minutes under a watch glass. Residual stripping composition was blotted with tissue paper and the spot it had occupied on the test panel rubbed with steel wool employed in circular motion. Dirt was wiper off with tissue soaked in the composition under study. Stripping was evaluated visually on a relative percentage basis.

Results are given in the table which follows.

TABLE

| Example | Composition | | Paint Removal (percent |
|---|---|---|---|
| | EDA (percent) | THF (percent) | |
| 1 | 0 | 100 | (¹) |
| 2 | 20 | 80 | (¹) |
| 3 | 30 | 70 | 5 |
| 4 | 40 | 60 | 100 |
| 5 | 50 | 50 | 100 |
| 6 | 60 | 40 | 50 |
| 7 | 65 | 35 | 40 |
| 8 | 70 | 30 | 5 |
| 9 | 80 | 20 | (¹) |
| 10 | 90 | 10 | (¹) |
| 11 | 100 | 0 | (¹) |

¹ Negligible.

It will be noted from the table that an effective stripping composition is formed at having ethylenediamine to tetrahydrofuran volume ratios in the range 30:70–70:30. Outside this range, the mixtures have negligible paint-stripping ability for epoxy-based paints. Both ethylenediamine and tetrahydrofuran alone are ineffective for such paints.

A number of additional runs were made to determine the effect of water on the ethylenediamine-tetrahydrofuran system as follows:

A. Examples 3–8 were substantially repeated except that 2% by volume of water, based on the volume of ethylenediamine present, was added to each paint-stripping composition;

B. Examples 3-8 were substantially repeated except that 5% of water was added to each paint-stripping composition;

C. Examples 5-8 were substantially repeated except that 7.5% of water was added to each paint-stripping composition;

D. Examples 3-8 were substantially repeated except 10% of water was added to each paint-stripping composition;

E. Examples 3-8 were substantially repeated except that 15% of water was added to each paint-stripping composition; and F. Examples 3-8 were substantially repeated except that 17% of water was added to each paint-stripping composition.

In each of the runs represented in sections A-F, above, the paint was stripped as effectively as in the corresponding example of the table. The spots on the panels left by this test, however, were brighter than in the corresponding examples and brightness increased with water content up to about 17%. At approximately 18% water the paint-stripping composition separates into two phases and is useless.

Having now described my invention, I claim:

1. A paint-stripping composition consisting essentially of ethylenediamine and tetrahydrofuran in a volume ratio in the range of about 30:70-70:30, respectively.

2. A composition of claim 1 in which the ethylenediamine:tetrahydrofuran volume ratio is in the range of about 60:40-50:50, respectively.

3. A composition of claim 1 which includes 2 to 3 percent by volume of a 40° Baumé solution of sodium silicate diluted with four parts water as an inhibitor for the corrosion of magnesium.

4. A composition of claim 1 which includes 0.1 percent by weight of hydroquinone as a stabilizer for the same.

5. A composition of claim 1 which includes up to about 17% by volume of water based on the volume of ethylenediamine.

6. A composition of claim 2 which includes up to about 17% by volume of water based on the volume of ethylenediamine.

References Cited by the Examiner

UNITED STATES PATENTS

| | | | |
|---|---|---|---|
| 2,990,391 | 6/1961 | Grantham | 252—364 |
| 3,173,876 | 3/1965 | Zobrist | 252—153 XR |
| 3,179,609 | 4/1965 | Morison | 134—38 |

OTHER REFERENCES

Condensed Chemical Dictionary, 4th ed. (1950), Reinhold Publ. Corp., pp. 276, 653, and 351.

LEON D. ROSDOL, *Primary Examiner.*

W. E. SCHULZ, *Assistant Examiner.*